(12) United States Patent
Ghandour

(10) Patent No.: US 7,243,107 B2
(45) Date of Patent: Jul. 10, 2007

(54) NETWORK RESOURCE CATEGORIZATION AND TRACKING APPARATUS, METHOD AND COMPUTER-MEDIUM

(76) Inventor: Rami Ghandour, 134 Denslow Ave., Los Angeles, CA (US) 90049

( * ) Notice: Subject to any disclaimer, the term of this patent is extended or adjusted under 35 U.S.C. 154(b) by 492 days.

(21) Appl. No.: 10/625,457

(22) Filed: Jul. 23, 2003

(65) Prior Publication Data
US 2005/0021532 A1    Jan. 27, 2005

(51) Int. Cl.
*G06F 17/30* (2006.01)
(52) U.S. Cl. .................................. 707/102
(58) Field of Classification Search ............ 707/1–10, 707/100–104.1, 200–206; 706/15
See application file for complete search history.

(56) References Cited

U.S. PATENT DOCUMENTS

| 6,571,227 | B1 * | 5/2003 | Agrafiotis et al. ............ 706/15 |
| 6,898,603 | B1 * | 5/2005 | Petculescu et al. ......... 707/101 |
| 2002/0029207 | A1 * | 3/2002 | Bakalash et al. .............. 707/1 |

* cited by examiner

*Primary Examiner*—Diane D. Mizrahi
(74) *Attorney, Agent, or Firm*—Patent Law Offices, MEW

(57) ABSTRACT

Disclosed is a system, method and computer media product for binding and tracking a plurality of network resources. The tracking system, method and medium includes a plurality of resources, each resource having a plurality of associated orthogonal resource material categories; and a resource controller, coupled to the plurality of resources, for grouping a subset of said plurality of resources having matching values for all of the associated orthogonal resource material categories.

6 Claims, 4 Drawing Sheets

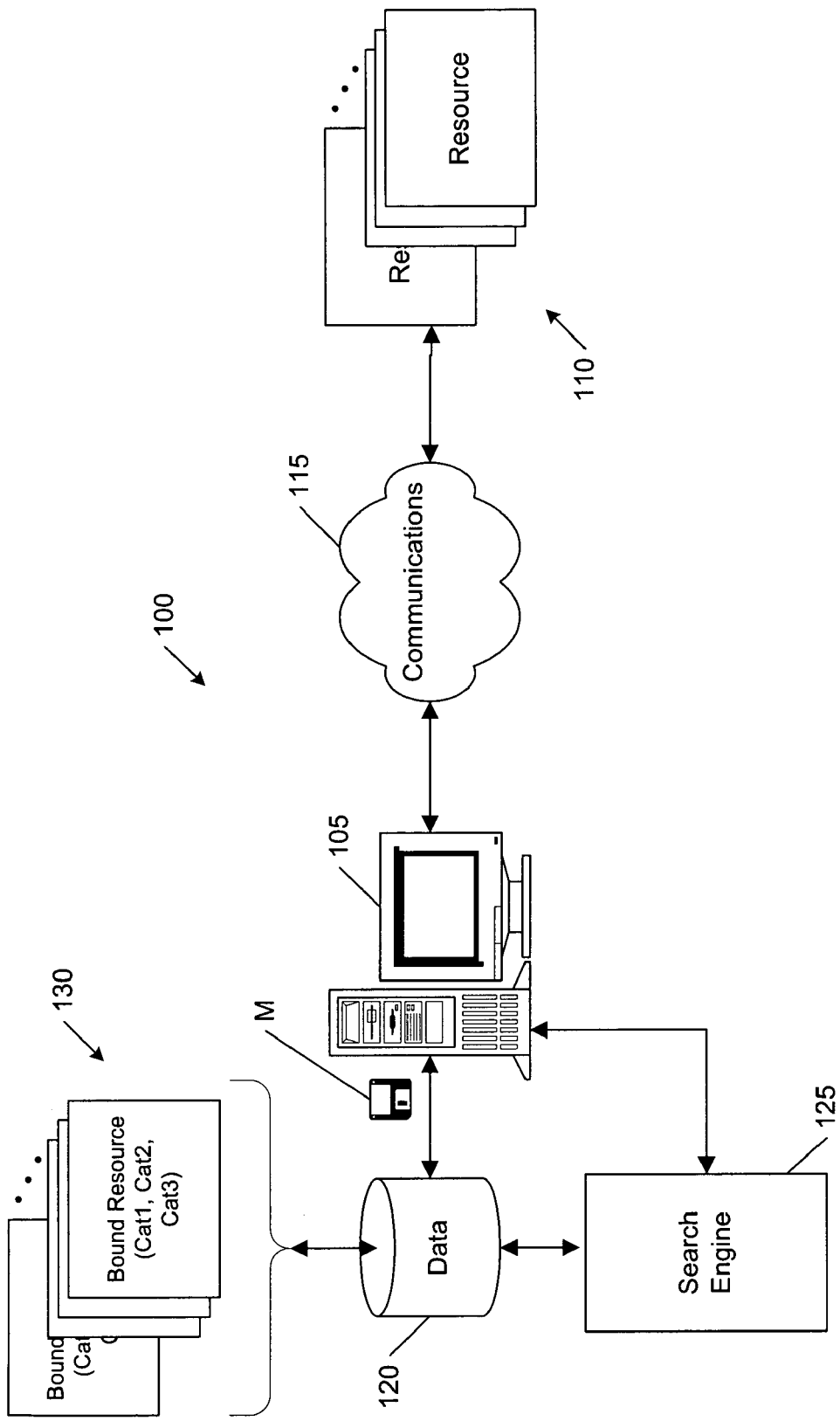
FIGURE_1

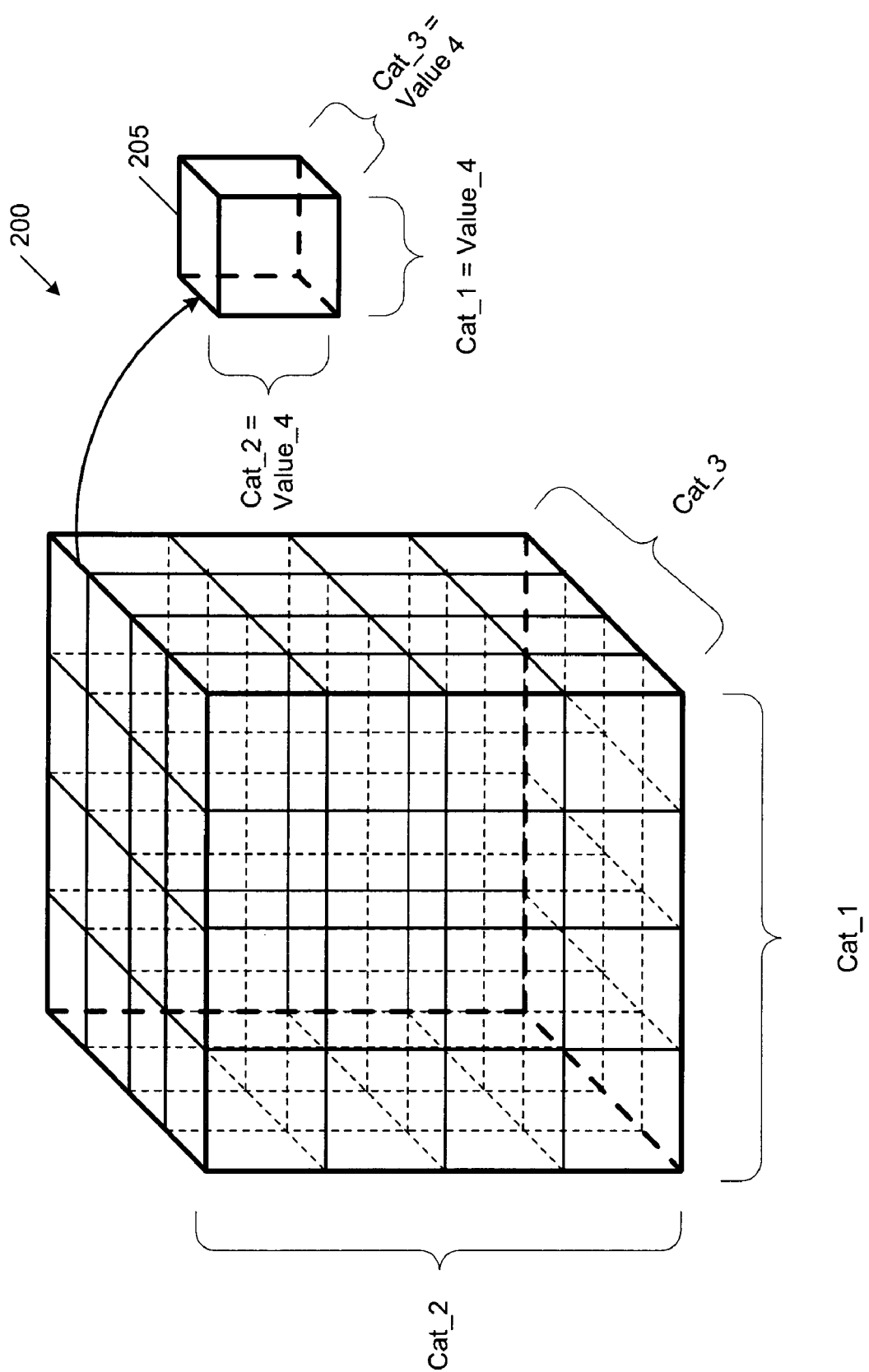
FIGURE_2

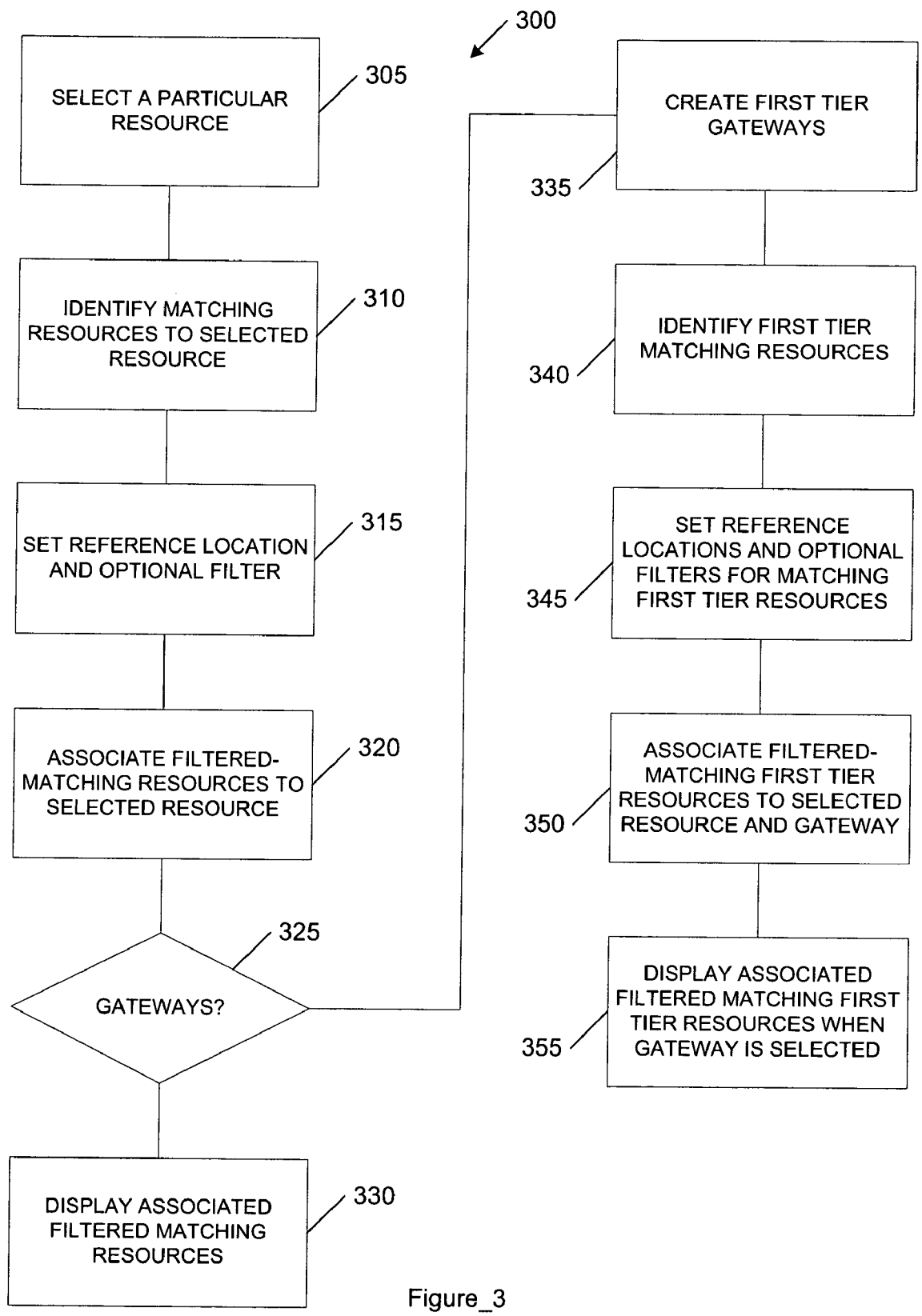
Figure_3

1. "Apple Announces Chip Deal and Other Moves to Lift PC's"
• Technology - Everyone - Corporate announcement 2. "Stocks Edge Higher as Investors Await Fed Decision"
• Financial Markets - Shareholders - Facts & Stats 3. "Consumer Confidence Remains Steady in June"
• Economy - Everyone - Facts & Stats 4. "Impatient Fed Seems Ready to Cut Again"
• Economy - Everyone - Facts & Stats 5. "Oracle Drops Condition to Complete PeopleSoft Bid"
• Technology - Everyone - M&A 6. "Biotech Companies Agree to Merge in $6.79 Billion Deal"
• BioTech - Everyone - M&A 7. "Already Battered, Tenet Healthcare Reduces Earnings Forecast"
• Healthcare - Shareholders - Facts & Stats 8. "U.S. Accuses Merck Unit of Cheating Health"
• Healthcare - Everyone - Legal 9. "4 Bids Submitted for Vivendi Unit"
• Media & Advertising - Everyone - M&A 10. "New 'Harry Potter' Book Sells 5 Million on First Day"
• Media & Advertising - Everyone - Corporate announcement Figure_4

NETWORK RESOURCE CATEGORIZATION AND TRACKING APPARATUS, METHOD AND COMPUTER-MEDIUM

BACKGROUND OF THE INVENTION

The present invention relates generally to categorization and tracking of network resources, and more particularly to associating a plurality of orthogonal category value parameters to each network resource in a particular space and for viewing, tracking and ordering resources based upon a degree of conformance of other resources to a particular selected resource.

There are untold numbers of documents that are available over the computer networks of today, whether it is a local network or a public network such as the Internet. The prior art has developed fairly sophisticated indexing and searching processes that help a user locate a particular document, or help a user put an article into some context by associating the document with other related documents or an identified topic.

There are two major types of document handlers: information producers and information portals. The information producer is like a newspaper or other publisher that generates new content. The information portal is like a newspaper stand or bookstore, aggregating and displaying a myriad of content from many sources.

This content is often made available online, with older documents continuously replaced by new content. A user is often able to search an archive for documents from the past, and sometimes there is a fee for searching and retrieving these documents.

A common format for presenting these documents is to provide a collection of short abstracts of the documents as well as a link associated with each document for accessing a complete version. Often, the collection is arranged so that related documents are grouped together. A user interested in a particular document navigates to the complete version using the link. Sometimes, there are additional links associated with the complete version to permit the user to navigate to the related documents presented in the original collection format, or sometimes to additional related documents previously undisplayed to the user.

It is one of the features of these systems that the user is presented with a virtually endless set of links for "related" documents with the system presenting a new set of links at the conclusion of each navigation step. It is a drawback that the user easily navigates off topic or at least off the specific point that the user was trying to pursue when activating a particular link.

Navigation systems for these documents provide a user with a "back" button to help the user recover from errant navigation choices. With the number of documents available, and the current type of indexing and searching available, it is easy for a user to become lost and off-topic requiring use of the "back" button to return to a reference position. Navigation is therefore somewhat of a "hit-or-miss" activity, sometimes requiring much patience to locate very relevant documents, should additional relevant documents exist.

It is another drawback that many documents lose relevancy as time lapses. As new content is generated, older content is replaced. There are too many documents to continue to present older documents along with the newer documents. Once these documents are not presented, an ability of a user to locate and use them is greatly diminished, assuming it is possible at all.

A cause of the present state of navigation uncertainty is the linear paradigm used for categorizing and tracking these documents. Due to the shear number of documents, the indexing and searching engines are often automated to analyze the content and select one or more relevant index terms. Subsequently, these index terms are used in grouping, retrieving and analyzing the associated documents, with "scores" used to refine the searches and present ordered lists of documents that best satisfy a search condition.

When available, a searchable field allows a user to find documents that have related index terms that satisfy the search, but these searches are one-dimensional and the navigation consequently becomes linear. A user hops from link to link, driven by computer-generated indices to documents that share a common term.

What is needed is a categorization and tracking system that provides a greater degree of relevance among "associated documents" and better navigation controls to provide a user with increased confidence that an identified navigation direction actually leads to documents having the desired and predicted characteristic.

SUMMARY OF THE INVENTION

Disclosed is a system, method and computer media product for binding and tracking a plurality of network resources. The tracking system, method and medium includes a plurality of resources, each resource having a plurality of associated orthogonal resource material categories; and a resource controller, coupled to the plurality of resources, for grouping a subset of said plurality of resources having matching values for all of the associated orthogonal resource material categories.

The present invention provides a categorization and tracking system that provides a greater degree of relevance among "associated documents" and better navigation controls to provide a user with increased confidence that an identified navigation direction actually leads to documents having the desired and predicted characteristic. The preferred embodiment aggregates matching resources, as determined by matching values for each of the orthogonal resource material categories. The matching is performed 'multi-dimensionally' to permit locating matching resources in a single space. Gateways of differing tiers provide portals between these spaces of related documents, with a user consciously moving from source space to destination space with a priori knowledge of the types of resources located in the destination space. Each destination space in turn having gateways of differing tiers to also provide intelligent navigation. By aggregating and associating resources in this fashion, and providing gateways between the spaces, resources are revitalized and help provide older resources with relevance, particularly when resources from the past are grouped with current resources. Previously unknown relationships and patterns emerge that were unable to be visualized using the existing systems.

For example, one benefit of the preferred embodiment is that it increases the ROI of every resource within the total resource space. Currently, the NY Times provides free access to "current" news but charges for "archived" news. Application of an embodiment of the present invention would permit the NY Times to "resurrect" every resource in their database. Articles that expired and are hidden behind newer resources may be easily identified by a reader/viewer; therefore, increasing the chance that the reader would pay to view these previously difficult to find resources.

These and other novel aspects of the present invention will be apparent to those of ordinary skill in the art upon review of the drawings and the remaining portions of the specification.

BRIEF DESCRIPTION OF THE DRAWINGS

FIG. 1 is a generalized schematic view of a preferred embodiment of resource binding and tracking system;

FIG. 2 is perspective illustration of a binding protocol of the preferred embodiment;

FIG. 3 is a generalized flowchart of a process for tracking bound resources; and FIG. 4 is a list of ten representative headlines, and the associated parameter values associated with three orthogonal resource material categories (e.g., subject, object and context binders).

DESCRIPTION OF THE SPECIFIC EMBODIMENTS

FIG. 1 is a generalized schematic view of a preferred embodiment of a resource binding and tracking system 100. System 100 includes a computing system 105 coupled to one or more resources 110 through a communications medium 115. Computing system 105 operates in cooperation with a database 120 and a search engine 125. Database 120 stores one or more bound resources 130 derived from resources 110.

Computing system 105 is a general purpose computer having a large number of suitable implementations for accessing and processing resources 110 to create and store bound resources 130, as well as to track and retrieve particular bound resources 130, and define gateways to bound resources 130, using database 120 and search engine 125.

Computer system 100 is a system that may function as a basic computer in implementing the present invention for binding, tracking, using and/or manipulating resources 110 and/or bound resources 130 as further described below. Computer system 100 includes a central processing unit (CPU), such as one of the PC microprocessors or workstations, e.g. RISC System/6000 (RS/6000) (RISC System/6000 is a trademark of International Business Machines Corporation) series available from International Business Machines Corporation (IBM), is provided and interconnected to various other components by a system bus. An operating system runs on the CPU, provides control and is used to coordinate the function of the various components of the computer system. Operating system may be one of the commercially available operating systems such as the AIX 6000 operating system or OS/2 operating system available from IBM (AIX 6000 and OS/2 are trademarks of IBM); Microsoft's Windows, Apple's MacOS, as well as UNIX and AIX operating systems. One or more application programs, controlled by the system, are moved into and out of a main memory RAM. These programs include the program of the present invention to be subsequently described in combination with binding and tracking resources. A read only memory (ROM) is connected to the CPU via the bus and includes the Basic Input/Output System (BIOS) that controls the basic computer functions. The RAM, an I/O adapter and a communications adapter are also interconnected to the system bus. The I/O adapter may be a Small Computer System Interface (SCSI) adapter that communicates with a disk storage device. The communications adapter interconnects the bus with an outside network enabling the data processing system to communicate with other such systems over communications system 115 (e.g., Local Area Network (LAN) or Wide Area Network (WAN), which includes, for example, the Internet, the WEB, intranets, extranets, and other public and private networks). The terms associated with communications system 115 are meant to be generally interchangeable and are so used in the present description of the distribution network. The I/O devices are also connected to the system bus via a user interface adapter and a display adapter. A keyboard and a pointing device (e.g., mouse, trackball or other device) are all interconnected to the bus through the user interface adapter. It is through such input devices that the user may interactively relate to the programs for manipulating the bound resources and navigating according to the present invention. The display adapter includes a frame buffer, which is a storage device that holds a representation of each pixel on a display screen. Images may be stored in the frame buffer for display on the display screen (e.g., monitor) through various components, such as a digital to analog converter and the like. By using the aforementioned I/O devices, a user is capable of inputting information to the system through the keyboard or mouse and receiving output information from the system via display. The system also contains a memory cache and includes a portion of a disk storage drive and a portion of the RAM.

Resources 110 are independently addressable "items" accessible by computer system 105 through communications system 115. These items are traditionally computer readable network files that are accessible using a uniform resource identifier (URI). For purposes of this description, a URI includes "addresses" using a uniform resource locator (URL), a universal naming convention (UNC) protocol, and/or a directory/file system (DFS), and/or other conventions for addressing/locating/retrieving data through communications system 115 using computer system 105. Thus, a resource in a broad sense includes these data pieces identified by the URI.

The preferred embodiment uses resources that are documents, such as news, information, references, or the like. These documents may be in virtually any format useable in cooperation with computer system 105. Other implementations or embodiments of the present invention may use additional types of resources, or different types of resources. Resources 110 may be available locally, remotely or distributed both locally and remotely. Communications system 115 includes local communications to access resources 110 through computer system 105.

Database 120 includes conventional relational database systems, flat-file databases, and other systems for storing, managing and retrieving database elements. The database may be local, remote, distributed or some combination, and may store the database elements, or the references to the database elements. Database 120 is illustrated as being directly associated with computer system 105 and search engine 125 in the preferred embodiment. In other implementations or embodiments, database 120 may be more strongly associated with resources 110 or communications system 115, or another computing system (not shown) coupled to computer system 105 or communications system 115.

Search engine 125 includes conventional searching/indexing processes for identifying and retrieving items based upon queries, though modified to provide searching/indexing for bound resources 130. As illustrated in FIG. 1, search engine is directly associated with computer system 105 and database 120. In other implementations and embodiments, search engine 125 may be remote or distributed, or some combination. In some implementations and embodiments, search engine 125 may be more strongly associated with resources 110 or with communications system 115, or another computing system (not shown) coupled to computer system 105 or communications system 115.

Bound resources 130 are included, directly or as references/pointers to resources, as database elements in database 120. A bound resource 130 is derived from one resource 110, and as discussed below, there may be a one-to-one, or a many-to-one, relationship between bound resources 130 and resources 110. Database 120 records the results of a binding process that associates a plurality of orthogonal resource material categories (and may optionally include one or more non-orthogonal categories) to resources 110, and tracks values assigned to those categories for each resource. The process of defining values for the associated categories of a particular resource 110 is a binding of that particular resource.

For purposes of the present description, the following are definitions for the terms "orthogonal" and "material" as used in the present invention. Orthogonal is used in the sense of mutually independent or non-overlapping. The orthogonal categories of the present invention are mutually independent because parameters for one orthogonal category may be changed without affecting parameters for the other orthogonal categories. Material is used as a noun, and used in the sense of defining the substance or substances from which the resource is made or can be made. An analysis from the resource alone derives the material of the resource.

FIG. 2 is perspective illustration of a binding protocol 200 of the preferred embodiment. Binding protocol 200 includes three orthogonal categories defining a three-dimensional space. Each category has four possible parameter values, therefore binding protocol 200 defines sixty-four possible resource spaces 205. System 100 allocates all resources 110 into binding protocol 200, with each resource 110 located into at least one of the sixty-four possible resource spaces 205. Mapping resources 110 into spaces 205 of binding protocol 200 transforms resources 110 into bound resources 130.

Of course, in other implementations or embodiments, binding protocol 200 may include more or fewer orthogonal categories (and in some instances include non-orthogonal categories), and more or fewer values per category. The number of possible category parameter values can vary from category to category, and the number and/or potential values for the category values may change dynamically over time. For example, new values may be added, or two or more existing values may be merged.

To simplify the discussion, a preferred example for the orthogonal categories will now be set forth. This example is not to be taken as limiting, but as an aid to understanding. Binding protocol 200 of the preferred embodiment uses three orthogonal material resource categories: a subject identity category, an object identity category, and a context category. The subject identity category answers the question "Who/what is the resource about?", the object identity category answers the question "Who/what does the resource affect?", and the context category answers the question "What is the context of the resource?".

Regarding the assignment of values to the resource categories, it is important not to overstretch these questions. Regarding the subject identity category, the question should be taken in its simplest form. An article about Microsoft that mentions its legal battles is simply about a software company or about technology.

Similarly, for the object identifier, who would be interested in that piece of information or data? Information is produced with an audience in mind. Who is the targeted audience? Who else might be interested? How do the potential entities of the object identity category relate to the subject identity bind? Taking the same Microsoft article, who would be interested? Every client computer user? Only shareholders of the Microsoft stock? Competitors? The object identifier may have an all-encompassing value: everyone.

Depending on context, information is viewed differently. Taking the Microsoft article, was the article written by lawyers for lawyers about the legal details? If so, then maybe the context was legal. Another article about IBM could be centered around the dividends that IBM is distributing, then the context may be financial.

The values used as parameters for the categories are preferably selected to uniquely define over the resource set while being as small as possible without unnecessarily fragmenting the bind space. The category parameter value options may be developed from statistical analyses, empirical review, or a combination thereof, of resources 110. This taxonomy development may be automatic, manual, or some combination of the two. The entire parameter value set for each category is likely to be unique, though some values may be shared among categories. While at least one value is established for each category, some resources may properly have multiple values. In these cases, the resource is duplicated and put into multiple spaces 205 to correspond with each set of parameter values. Some parameter values may be broad, such as an "everyone" value for an object identity category.

Just as the possible parameter values may be developed automatically, or manually, the assignment of parameter values to each of the orthogonal resource material categories may be automatic or manual as well. The preferred embodiment uses a manual assignment process of resource review and classification, though other implementations and embodiments may employ automatic systems. As the automatic synthesis and analysis of resources improves and becomes more sophisticated, the automatic classification improves as well.

A gateway is a portal from one space 205 to another space 205. Each space 205 likely has a variable density as the number of resources in each space is unlikely to be the same. Binding protocol 200 ensures that all bound resources 130 in each space 205 has matching values for all the orthogonal resource material categories. Once one bound resource 130, or one particular space 205, is identified, all associated bound resources 130 in space 205 are easily identified. Example, when space 205 identifies "BigBusiness" "Shareholders," and "M&A" as values for the subject identity category, object identity category and context category, respectively, all bound resources 130 with these exact values are available in the space. The preferred embodiment not only aggregates matching bound resources 130 in every space 205, but also provides gateways to other spaces 205 that may be of interest. A tier one gateway identifies a gateway in which N−1 categories have matching values (where N is the number of orthogonal categories in binding protocol 200). In other words, first tier gateways lead to "BigBusiness/Shareholders/dnc," "BigBusiness/dnc/M&A," and "dnc/Shareholders/M&A" (where "dnc" means "do not care"). When N=3, tier two gateways may also be used, where only one category includes matching values.

When a user selects a particular gateway, the various values for "dnc" may be a sub-selection to identify a specific space 205 or a range of spaces 205. When the user enters a gateway, the user knows the type of bound resources 130 in the destination space 205. For example, when the user selects the "BigBusiness/dnc/M&A" tier one gateway, all destination spaces 205 will include resources having BigBusiness as the subject and M&A as the context. Selecting the "BigBusiness/dnc/dnc" tier two gateway includes all destination spaces 205 having resources with BigBusiness as the subject.

In addition to, and complementary with, binding protocol 200, system 100 may implement non-orthogonal categories or associated fields to filter or qualify bound resources 130. Examples of non-orthogonal categories include time, resource source, medium/format type, company name(s), etc. For example, in the example above, the user may request to see resources from the last week (or resource older than one week), or resources from a particular newswire or portal site, or only those in PDF, or some combination thereof. These filters may be applied as desired to bound resources 130. Some spaces 205 may be sufficiently dense that some filtering/ordering is advantageous to produce subsets of bound resources that aid in navigation.

FIG. 3 is a generalized flowchart of a process 300 for tracking bound resources 130. Process 300 begins at step 305 when a particular bound resource 130 or a particular space 205 is selected. After selecting a resource 130, process 300 identifies bound resources 130 matching the resource selected at step 310.

Next, at step 315, process 300 sets a reference location in the relevant space 205 and applies any desired filtering or ordering of matching bound resources 130 by applying optional one or more filter categories or ordering processes. In the preferred embodiment, these filter categories are non-orthogonal. In some implementations, is convenient when entering a space 205 to filter/order bound resources 110 inside to provide the convenient reference location to navigate among the resources and gateways. The reference location may be the selected resource from step 205, or another resource matching the selection/filtering/ordering processes applied to space 205.

At step 320, process 300 thereafter associates the matching resources 130 to the selected resource from step 305. When the optional filtering/ordering has occurred, the association is preferably of the applicable subset of bound resources of space 205. In some implementations, it may be more convenient to associate all bound resources 110 to the selected resource and filter a display/presentation of the associated resources.

After associating the filtered, matching resources at step 325, process 300 performs a test at step 325 to determine whether any gateways should be presented or created. When the test at step 325 is negative, process 300 advances to step 330 to display the associated filtered matching resources.

However, when the test at step 325 is positive that gateways are desired, process 300 advances to step 335 from step 325. Step 335 creates first tier gateways based on the selected resource from step 305. Next, at step 340, process 300 identifies first tier matching resources for each gateway. Process 300 sets a reference location and applies optional filters/ordering processes to matching resources (step 345), associates the reference location and filtered/ordered matching resources (step 350) and displays associated, filtered, matching resources (step 355) for each gateway.

If additional tier gateways are to be added, process 300 repeats step 335 through step 355, for each tier. When no more tier levels are desired, process 300 is done until a new resource is selected from another space 205 (step 305). The reference location is, in the preferred embodiment, a sub-region in space 205 and not a particular resource (though one or more particular resources may represent the reference location).

FIG. 4 is a list of ten representative headlines, and associated parameter values associated with three orthogonal resource material categories (e.g., subject, object and context binders). Under every headline, parameter values are indicated for the categories in order: subject, object, and context. A small binding protocol 200 is established with these ten resources. Bound resource #3 and bound resource #4 have a perfect match and share a space 205. Bound resource #2 and bound resource #7 have a match in two categories; therefore they are linked by a first tier gateway and would as a consequence be easier for a reader to find them both when interested in either one.

A relationship is established between the following four bound resources:

1. "Apple announces . . . "
5. "Oracle Drops . . . "
6. "Biotech Companies . . . "
9. "Bids submitted for Vivendi . . . "

1 and #5 match the subject/object (Technology, Everyone) categories but have different values for the context category. #5, #6 and #9 match the object, context categories (Everyone, M&A) but have different values for the about category.

Under many conventional linear systems having a single category, #1 and #5 would likely be grouped under Technology. However, when a reader is interested in the Oracle story because of its context category (M&A), the reader will be unable to find the #6, and #9 resources under the conventional system architecture after a few days. Stories will be archived and gone.

One of the preferred implementations of the present invention is as a routine in an operating system made up of programming steps or instructions resident in the RAM of computer system 105 (shown in FIG. 1), during computer operations. Until required by computer system 105, the program instructions may be stored in another readable medium, e.g. in the disk drive, or in a removable memory M shown in FIG. 1, such as an optical disk for use in a CD ROM computer input or in a floppy disk for use in a floppy disk drive computer input. Further, the program instructions may be stored in the memory of another computer prior to use in the system of the present invention and transmitted over a LAN or a WAN, such as the Internet, when required by the user of the present invention. One skilled in the art should appreciate that the processes controlling the present invention are capable of being distributed in the form of computer readable media in a variety of forms.

The above-described arrangements of apparatus and methods are merely illustrative of applications of the principles of this invention and many other embodiments and modifications may be made without departing from the spirit and scope of the invention as defined in the claims. These and other novel aspects of the present invention will be apparent to those of ordinary skill in the art upon review of the drawings and the remaining portions of the specification.

What is claimed is:

1. A method implemented on a computer system having a display, the method comprising:
 a) responding to user navigation commands to select a resource from a plurality of resources, each resource having a plurality of orthogonal resource material categories;

b) associating a subset of said plurality of resources with said selected resource, said subset of resources having values for all of said orthogonal resource material categories matching said orthogonal resource material categories of said selected resource; and c) displaying said selected resource and subset of resources;

and creating a gateway to a second subset of resources, said second subset of resources having values for less than all of said orthogonal resource material categories matching said orthogonal resource material categories of said selected resource.

2. A resource binding apparatus, comprising:

means for associating a plurality of orthogonal resource material categories stored in a machine-readable memory to each of a plurality of resources to bind said plurality of resources with each resource having a plurality of associated orthogonal resource material categories and a resource-derived value for each of said plurality of associated orthogonal resource material categories stored in said machine-readable memory; and means for aggregating one or more subsets of said plurality of resources from said machine-readable memory, each said subset of said plurality or resources having matching resource-derived values for all of said associated orthogonal resource material categories to group related ones of said plurality or resources together, wherein said orthogonal resource material categories include a subject identity category, an object identity category, and a context category.

3. A resource tracking system, comprising:

a machine-readable memory storing a plurality of resources, each resource having a plurality of associated orthogonal resource material categories and a resource-derived value for each of said plurality of associated orthogonal resource material categories stored in said machine-readable memory; and a resource controller, coupled to said machine-readable memory, aggregating one or more subsets of said plurality of resources together from said machine-readable memory, each said subset of said plurality of resources having matching resource-derived values for all of said associated orthogonal resource material categories, wherein said orthogonal resource material categories include a subject identity category, an object identity category, and a context category.

4. A resource binding method, the method comprising:

a) associating a plurality of orthogonal resource material categories stored in a machine-readable memory to each of a plurality of resources to bind said plurality of resources with each resource having a plurality of associated orthogonal resource material categories and a resource-derived value for each of said plurality of associated orthogonal resource material categories stored in said machine-readable memory; and b) aggregating one or more subsets of said plurality of resources from said machine-readable memory, each said subset of said plurality of resources having matching resource-derived values for all of said associated orthogonal resource material categories to group related ones of said plurality of resources together, wherein said orthogonal resource material categories include a subject identity category, an object identity category, and a context category.

5. A computer program product comprising a computer readable medium carrying program instructions for binding a plurality of resources when executed using a computing system, the executed program instructions executing a method, the method comprising:

a) associating a plurality of orthogonal resource material categories stored in a machine-readable memory to each of a plurality of resources to bind said plurality of resources with each resource having a plurality of associated orthogonal resource material categories and a resource-derived value for each of said plurality of associated orthogonal resource material categories stored in said machine-readable memory; and b) aggregating one or more subsets of said plurality of resources from said machine-readable memory, each said subset of said plurality of resources having matching resource-derived values for all of said associated orthogonal resource material categories to group related ones of said plurality of resources together, wherein said orthogonal resource material categories include a subject identity category, an object identity category, and a context category.

6. A resource tracking system implemented using a computer-system, comprising:

a plurality of resources stored in a computer-readable memory of the computer system, each resource having three associated orthogonal resource material categories, said three associated orthogonal resource material categories including a subject identity category, an object identity category, and a context category with each material category of each particular one of said plurality of resources having a value derived from said particular one resource; and a resource controller of the computer system, coupled to said plurality of resources in said computer-readable memory, to:

a) associate a plurality of orthogonal resource material categories stored in said machine-readable memory to each of a plurality of resources to bind said plurality of resources with each resource having a plurality of associated orthogonal resource material categories and a resource-derived value for each of said plurality of associated orthogonal resource material categories stored in said machine-readable memory; and b) aggregate a plurality of subsets of said plurality of resources from said machine-readable memory, each said subset of said plurality of resources having matching resource-derived values for all of said associated orthogonal resource material categories to group related ones of said plurality of resources together, wherein said orthogonal resource material categories include a subject identity category, an object identity category, and a context category.

* * * * *